United States Patent [19]
St. Pierre

[11] 3,851,894
[45] Dec. 3, 1974

[54] CONNECTOR
[76] Inventor: Henri J. St. Pierre, 39 Yarmouth Rd., Nashua, N.H. 03060
[22] Filed: May 30, 1973
[21] Appl. No.: 365,069

[52] U.S. Cl............. 280/460 R, 280/481, 280/510, 172/275, 37/42 R
[51] Int. Cl.......................... B60d 1/10, B60d 3/00
[58] Field of Search................... 280/460, 481, 510; 37/42 R; 172/275

[56] References Cited
UNITED STATES PATENTS
3,351,357 11/1967 Van Eaton..................... 280/460 A
3,403,802 10/1968 Lundell........................... 172/275 X
3,410,008 11/1968 Standfuss........................... 37/42 R Primary Examiner—Leo Friaglia
Attorney, Agent, or Firm—Richard I. Seligman

[57] ABSTRACT

A connector for attaching implements such as snow plows to vehicles having an attaching shaft thereon includes spaced forked tines and a pair of spring biased lock plates adjacent the tines and having holes therein. To provide a connection, the vehicle attaching shaft enters the space between the tines, forces the lock plates open and enters the holes therein whereupon the lock plates close, locking the shaft to the connector. A lock-release mechanism is also provided.

8 Claims, 4 Drawing Figures

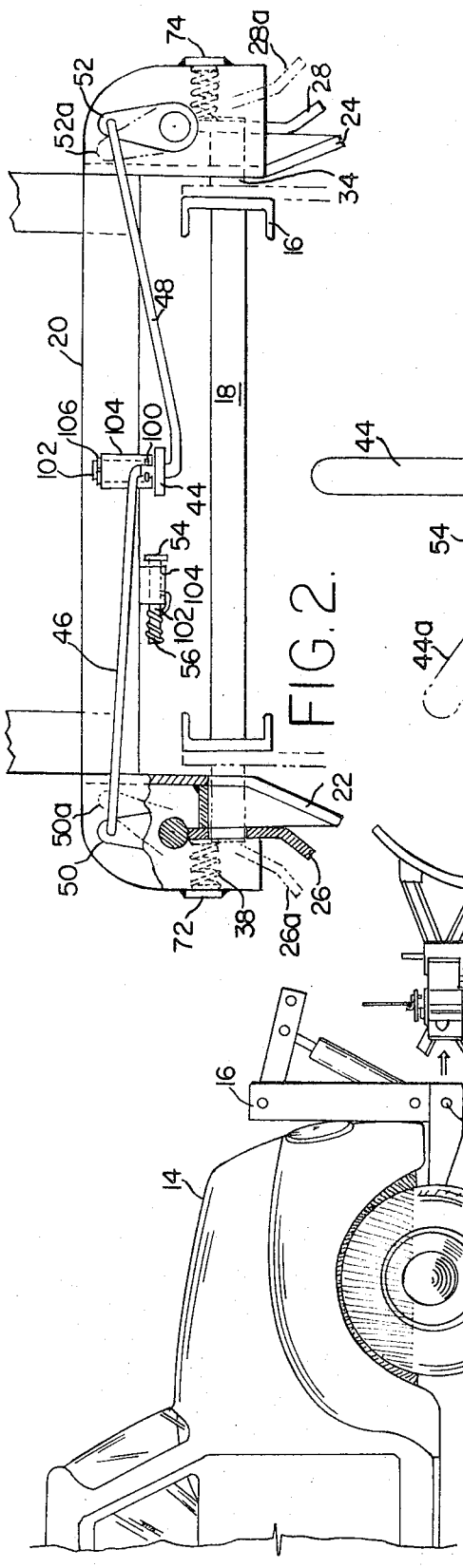
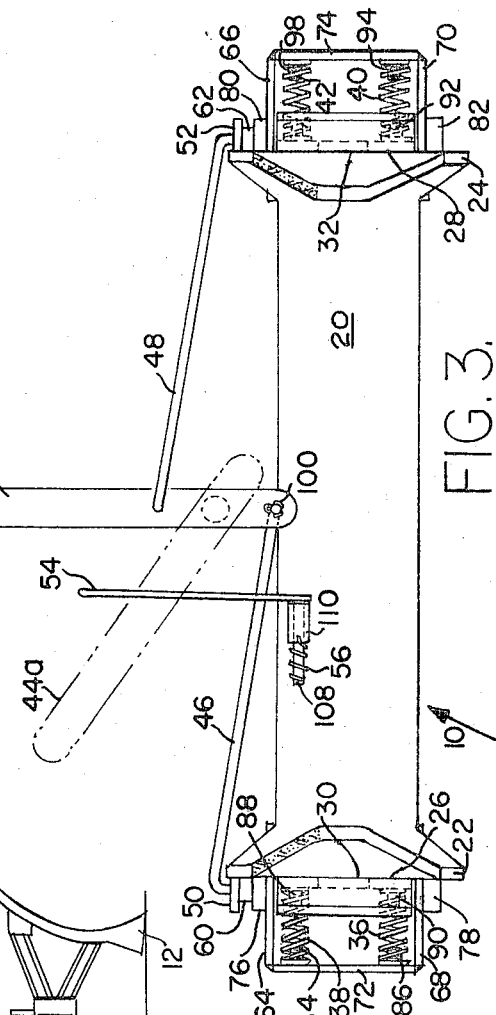
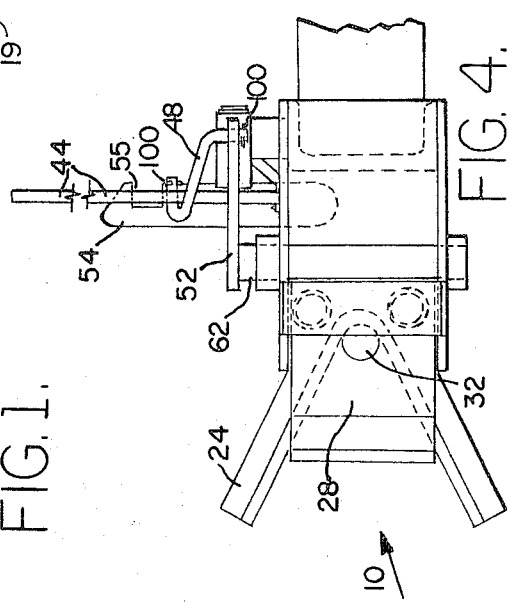

CONNECTOR

BACKGROUND OF THE INVENTION

Many implements such as snow plows, farming plows, back hoes and the like are temporarily attached to a frame assembly on a driving vehicle such as a truck. Usually two men are required to attach the implement since it is difficult to align the truck and implement so that a proper connection can be made. Also, final mechanical connections between the truck and implement must be made outside the truck.

Attempts have been made to alleviate the problem of requiring two men to attach an implement to a vehicle. For example, U.S. Pat. No. 3,150,884 is directed to a means for connecting snow plow blades to the front of vehicles by driving the vehicle toward the plow assembly. There are many drawbacks to that disclosed in said U.S. Pat. No. 3,150,884. First of all it is necessary that the driver of the truck leave his vehicle to lock balls within their respective sockets. This is undesireable particularly when dealing with snow plows since often the plow assembly becomes clogged with snow and ice making the locking job difficult and requiring the use of much force. Also, if the alignment of the balls and sockets are not perfect locking will not be possible.

The mechanism of U.S. Pat. No. 3,150,884 is also relatively expensive to manufacture requiring close tolerance between the balls and sockets. Also, the ball joint is an unsatisfactory means for attaching a snow plow since sideward movement of the plow during use exerts undue force on the ball trying to snap it and, thus, lowering the reliability of the device. Furthermore, the balls and sockets must be properly aligned if they are to mate. If the ball is somewhat higher than the ball receiving socket it will tend to lift it to meet the ball. However, if the ball is lower than the ball receiving socket it will not cause change between the ball and socket and will not form a joint therewith. Also, U.S. Pat. No. 3,150,884 further shows a throw-out lever disposed at the side of the mechanism which could be problemsome if the plow is at an extreme angle when the lever is operated as the plow could interfere with such operation.

SUMMARY OF THE INVENTION

Accordingly, it is an object of this invention to provide an improved connector for snow plows and the like.

It is another object of this invention to provide a connector which permits an operator to readily attach a plow or other implement to his vehicle without leaving such vehicle.

It is a further object of this invention to provide a connector which, although readily detachable, is sufficiently rigid to withstand the stresses to which a plow is normally subjected, and which cannot be jarred loose or broken when the vehicle travels over rough terrain or the plow is moved in any direction.

It is yet another object of this invention to provide a connector which permits an operator to readily attach a plow or other implement to his vehicle although there is some misalignment between the connector and vehicle.

Briefly, a connector is provided for simply attaching a snow plow or other implement to a vehicle. The vehicle includes a shaft thereon mounted on a frame. The connector includes a main frame having opposed forked tines and spring biased lock plates, with holes therein, arranged outside the tines. The connector is attached to the plow frame by permitting the ends of the vehicle shaft to seat within the holes in the lock plates by merely driving the vehicle toward the connector. The forked tines are v-shaped and arranged at an obtuse angle to allow initial misalignment between the connector and vehicle and yet accomplishing locking. A release mechanism is provided to open the plates so that the plow may be detached by merely driving away from the connector.

BRIEF DESCRIPTION OF THE DRAWINGS

The above-mentioned and other features and objects of the invention will become more apparent by reference to the following description taken in conjunction with the accompanying drawings, in which:

FIG. 1 is schematic drawing illustrating a vehicle in relation to a plow connector configured according to the invention;

FIG. 2 is plan view of the connector of FIG. 1 showing a vehicle attaching shaft mounted therein;

FIG. 3 is a front view of the connector of FIGS. 1 and 2; and

FIG. 4 is a side view of the connector of FIGS. 1–3.

DESCRIPTION OF PREFERRED EMBODIMENT

Referring now to the drawings, there is illustrated thereby a connector 10 for attaching a snow plow 12 or other implement to a vehicle 14. The vehicle has mounted on the front thereof a plow frame 16 with a shaft 18 disposed at the lower portion thereof. Shaft 18 extends outward from the sides of the frame 16. Connector 10 is attached to the plow frame at shaft 18.

A jack 19 is employed to raise the connector off the ground.

The connector 10 is comprised of a main frame 20 having forked tines 22, 24 at the ends thereof. Arranged outside the forked tines 22, 24 are a corresponding pair of lock plates 26, 28 having holes 30, 32 therein.

The connector is attached to the plow frame by permitting the ends 34 of the shaft 18, which protrude from the plow frame, to seat within the holes 30, 32. The forked tines are v-shaped to permit seating of the shaft 18 within the holes 30, 32 even though the shaft and holes are misaligned. That is, the shaft will enter the holes as long as it is within the confines of the tines; whether it is above or below the holes heigthwise has no detrimental effect. The forked tines are also disposed at an obtuse angle with respect to the main frame 20 so as to accomplish mating between the holes notwithstanding some sideways misalignment between the plow frame, and, thus, shaft 18, and the connector.

The lock plates 26, 28 are biased against the forked tines 22, 24 by pairs of springs 36, 38 and 40, 42. When the shaft 18 enters the forked tines it forces the lock plates against their springs to enlarge the inner space between the lock plates permitting the shaft to enter the holes 30, 32. When the shaft 18 enters the holes 30, 32, the springs push against the lock plates resetting them in their closed position. The lock plate 26 is shown in the open position in FIG. 2 by the dotted lines 26a and 28a.

The other principal components of the connector are a lock-release mechanism including a release handle 44 having attached thereto a pair of rods 46, 48. The opposite ends of rods 46, 48 are attached to connecting arms 50, 52, which are coupled to the lock plates. A release handle latch 54 is attached to the frame 20 and has a spring 56 to permit the latch to move inward from the frame 20. Latch 54 has a notch 55 therein. The release handle is centrally located so as to permit operation when the plow is orientated in any direction.

For aiding in an understanding of the invention fine details of the preferred embodiment have been omitted above and are now disclosed.

The lock plates 26, 28 are attached by, for example, welding to a pair of shafts 60, 62. Attached to the forks 22, 24 are upper 64 66, and lower 68, 70 plates which the upper and lower plates are connected by crossbars 72, 74. These plates are connected to the forks and to the crossbars by, for example, welding. The shafts 60, 62 rotate within bushings 76, 78 and 80, 82 welded to the plates.

The springs 36 and 38 are disposed about four extensions 84, 86, 88 90 welded to the crossbar and lock plates. In like fashion the springs 40 and 42 are arranged about extensions 92, 94, 96, 98.

The arms 50, 52 are welded to the shafts 60, 62 for rotating same and, thus, the lock plates to the open position. Cotter pins 100 are preferably used to connect the rods 46, 48 to the release handle 44 and the arms 50, 52.

The release handle 44 has a right angle extension 102 which is rotatably disposed in a bushing 104 mounted to the main frame by, for example, welding. A washer and cotter pin 106 maintains the release handle extension within the bushing.

The release handle latch also has an extension 108 and is mounted in a bushing 110 attached to the main frame.

To attach the connector to the vehicle, the vehicle is moved forward toward the connector such that the shaft 18 enters the forked tines 22, 24. As noted above the tines are v-shaped and arranged at an obtuse angle to permit some misalignment between the vehicle and connector and yet allow the connection to be made. The shaft 18 pushes against the lock plates 26, 28 and enters the holes 30, 32 therein. Springs 36, 38, 40, 42 force the lock plates to return to their closed position whereby the shaft is secure in the holes and cannot release therefrom unintentionally. After the shaft is secured in the lock plates the jack may be screwed up into the frame.

To remove the plow from the vehicle, release handle 44 is pulled down into the notch 55 in the release handle latch. This is shown by the dotted lines 44a. This action is transmitted through the rods 46, 48 and connecting arms 50, 52 to open the lock plates and allow the vehicle to be backed away and out from the plow connector. The dotted lines 50a and 52a illustrate the arms 50, 52 in position whereby the lock plates are open.

A chain (not shown) may be attached to the plow frame and loosely coupled to the release handle latch, by for example dropping a link over the latch, so that when the vehicle backs away from the plow the chain will permit the handle to go to its upright position permitting the operator to later attach the plow without manual operation of the release handle.

While I have described above the principles of my invention in connection with specific apparatus, it is to be clearly understood that the specification is presented by way of example only and not as a limitation of the scope of this invention as set forth in the accompanying claims.

I claim:

1. A connector for attaching an implement to a vehicle having an attaching shaft thereon, comprising:
   a main frame having a fork on either side thereof and adapted to receive an attaching shaft;
   a pair of lock plates, each having a hole therein adjacent the closed end of the fork and disposed outside said forks;
   means for laterally biasing said lock plates against said forks such that forces applied to the inner portions of said lock plates by an attaching shaft against said biasing means will cause outward lateral movement of said lock plates; and
   means for opening said lock plates to permit release of the attaching shaft.

2. A connector as defined in claim 1, said forks being v-shaped.

3. A connector as defined in claim 1, said forks being arranged at an obtuse angle with respect to said main frame.

4. A connector as defined in claim 1, further including at least two springs biasing said lock plates toward said forks.

5. A connector as defined in claim 1, wherein said opening means includes a release handle; a pair of connecting arms, one coupled to each of said lock plates; and a pair of rods coupling said release handle to said connecting arms such that operating said release handle causes rotation of said connecting arms through said rods and causes lateral movement of said lock plates permitting disconnection of the connector from the attaching shaft.

6. A connector as defined in claim 5, further including means for latching said release handle in an open position.

7. A connector as defined in claim 6, further including means for releasing said latch when the connector is removed from the attaching shaft.

8. A connector as defined in claim 7, wherein said means for releasing said latch includes a chain attached to the vehicle and loosely coupled to said latching means.

* * * * *